(12) United States Patent
Rambo

(10) Patent No.: US 8,666,047 B2
(45) Date of Patent: *Mar. 4, 2014

(54) HIGH QUALITY AUDIO CONFERENCING WITH ADAPTIVE BEAMFORMING

(75) Inventor: Darwin Rambo, Cloverdale (CA)

(73) Assignee: Broadcom Corporation, Irvine, CA (US)

( * ) Notice: Subject to any disclaimer, the term of this patent is extended or adjusted under 35 U.S.C. 154(b) by 1711 days.

This patent is subject to a terminal disclaimer.

(21) Appl. No.: 11/685,148

(22) Filed: Mar. 12, 2007

(65) Prior Publication Data

US 2007/0154001 A1    Jul. 5, 2007

Related U.S. Application Data

(63) Continuation of application No. 10/697,670, filed on Oct. 29, 2003, now Pat. No. 7,190,775.

(51) Int. Cl.
*H04M 3/42* (2006.01)
*H04M 11/00* (2006.01)
*H04M 1/00* (2006.01)
*H04L 12/16* (2006.01)
*H04Q 11/00* (2006.01)
*H04N 7/14* (2006.01)

(52) U.S. Cl.
USPC ............. 379/202.01; 379/93.21; 379/158; 379/201.01; 370/260; 455/416; 348/14.08

(58) Field of Classification Search
USPC ............ 379/201.01–205.01, 406.01, 406.06, 379/409.09, 90.01, 93.01, 93.21, 157, 158, 379/207.01; 370/259, 260, 261, 262; 455/414.1, 416; 348/14.01, 14.02, 348/14.03, 14.04, 14.05, 14.06, 14.08, 348/14.09, 14.1, 14.11, 14.12, 14.13, 14.14, 348/15.15, 14.16

See application file for complete search history.

(56) References Cited

U.S. PATENT DOCUMENTS

| 5,020,098 | A  | * | 5/1991  | Celli .................. 379/202.01 |
| 6,192,134 | B1 | * | 2/2001  | White et al. ............... 381/92 |
| 6,215,515 | B1 | * | 4/2001  | Voois et al. ............. 348/14.01 |
| 6,505,040 | B1 | * | 1/2003  | Kim ....................... 455/416 |
| 2002/0159603 | A1 | * | 10/2002 | Hirai et al. ................. 381/61 |

OTHER PUBLICATIONS

Newton's Telecom Dictionary, p. 469, 18th Edition, Feb. 2002.*

* cited by examiner

*Primary Examiner* — Khai N Nguyen
(74) *Attorney, Agent, or Firm* — Thomas | Horstemeyer, LLP

(57) ABSTRACT

Systems and methods that enable high quality audio teleconferencing are disclosed. In one embodiment of the present invention, a signal processor receives signals from a spatially dispersed set of directional microphones, processing the microphone signals and the far-end received audio into a signal for transmission to a far-end party. The processing may comprise the use of one or more algorithms that reduce conference room noise and may selectively increase participant audio levels by processing the microphone signals using beamforming techniques. An embodiment of the present invention may also comprise one or more omni-directional microphones that may be used in cooperation with the directional microphones to adjust for background noise, acoustic echo, and the existence of side conversations.

39 Claims, 8 Drawing Sheets

HIGH QUALITY AUDIO CONFERENCING WITH ADAPTIVE BEAMFORMING

RELATED APPLICATIONS

The present patent application is a continuation of U.S. patent application Ser. No. 10/697,670 entitled "HIGH QUALITY AUDIO CONFERENCING WITH ADAPTIVE BEAMFORMING", filed Oct. 29, 2003, which issued as U.S. Pat. No. 7,190,775 on Mar. 13, 2007, the complete subject matter of which is hereby incorporated herein by reference, in its entirety.

INCORPORATION BY REFERENCE

[Not Applicable]

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

The use of teleconferencing systems is commonplace when meetings extend across multiple locations. Attendees typically gather in an office or meeting room and are seated at various locations about the room. The room used for the teleconference is typically not equipped with special sound tailoring materials, and echoes of both near and far-end voices add to the noise level. If the room is large enough, some attendees may be seated away from the conference table, distancing themselves from the microphones. Some of the attendees may not actively participate, or may contribute only occasionally. Their presence, however, adds to the number of sources of room noise as pencil tapping, paper rustling, and side conversations develop. These noise sources further degrade the sound quality experienced by the far-end party.

The majority of teleconferencing systems have microphones deployed at one, two, or at most three locations. The microphones are typically positioned on the surface of a conference table, distributed in a manner that provides the best pickup of the most significant contributors to the meeting. This selection of microphone positions may make some of the contributors difficult to hear. Occasional participants are frequently forced to move closer to a microphone when they speak, creating additional room noise as they switch seats or move chairs.

Further limitations and disadvantages of conventional and traditional approaches will become apparent to one of ordinary skill in the art through comparison of such systems with the present invention as set forth in the remainder of the present application with reference to the drawings.

BRIEF SUMMARY OF THE INVENTION

Aspects of the present invention may be found in an audio conferencing system comprising at least one loudspeaker for converting a first electrical signal into sound, a plurality of conference stations in spaced relation, and a signal processor. Each of the plurality of conference stations may comprise a directional microphone for converting sound into a directional microphone signal, and the directional microphone signals may collectively form a plurality of directional microphone signals. The signal processor may modify at least one of the plurality of directional microphone signals and a receive signal, and may produce at least one of a transmit signal and the first electrical signal. The modifying may comprise an algorithm to perform acoustic echo cancellation, and the modifying may also comprise an adaptive beamforming technique. In an embodiment of the present invention, the adaptive beamforming technique may comprise at least one of a normalized least mean squares algorithm and a recursive least squares algorithm.

In an embodiment of the present invention, the modifying may combine the plurality of directional microphone signals in order to selectively attenuate or amplify a sound source. The modifying may select for separate processing at least two groups of directional microphone signals from the plurality of directional microphone signals. The modifying of each of the at least two groups may use an adaptive beamforming technique. An embodiment of the present invention may also comprise at least one omni-directional microphone for converting a sound field into an omni-directional microphone signal. The modifying in such an embodiment may comprise combining at least one of the plurality of directional microphone signals and the at least one omni-directional microphone signal, based upon at least one room condition. The at least one room condition may comprise at least one of background noise, a level of acoustic echo, and the detection of side conversations.

In another embodiment of the present invention, each of the conference stations may comprise a transducer for producing an acoustic test signal, and the signal processor may use a test signal to determine at least one of microphone and room acoustic characteristics. The contribution to the transmit signal of a selected sound source relative to other sound sources may be increased or decreased from a location remote from the audio conferencing system. An embodiment of the present invention may comprise an interface compatible with a communication network, and the interface may couple the transmit signal to the communication network, and the communication network to the receive signal. The communication network may be a packet network. An embodiment in accordance with the present invention may also comprise a manual input device used for at least one of controlling calls and entering system parameters, and the signal processor may be a digital signal processor.

Aspects of the present invention may also be seen in a method of operating an audio conferencing system. Such a method may comprise receiving a first electrical signal, and transducing each of a plurality of sound fields into a microphone signal. The microphone signals may collectively form a plurality of microphone signals. The method may also comprise processing at least one of the plurality of microphone signals and the first electrical signal to produce a second electrical signal, and transmitting the second electrical signal. The processing may comprise an algorithm to perform acoustic echo cancellation, and the processing may comprise an adaptive beamforming technique. The adaptive beamforming technique may comprise at least one of a normalized least mean squares algorithm and a recursive least squares algorithm. The processing may also comprise selecting at least two groups of microphone signals from the plurality of microphone signals, and each of the at least two groups of microphone signals may be used in a separate adaptive beamforming arrangement. The processing may use at least one parameter representative of at least one of a microphone acoustic characteristic, a transmission delay, and an acoustic characteristic of a room. In an embodiment of the present invention, the processing may be modified remotely during operation, and the processing may be performed using a digital signal processor. At least one of the first electrical signal and the second electrical signal may be a digital signal, and at least one of the first electrical signal and the second electrical signal may be compliant with a packet protocol.

Another embodiment of the present invention may comprise generating a first electrical test signal, converting the first electrical test signal to an acoustic test signal at a first location, sampling the acoustic test signal at a second location, transforming the sampled acoustic test signal into a second electrical test signal, and deriving at least one of a microphone acoustic characteristic, a transmission delay, and an acoustic characteristic of a room using the second electrical test signal.

Further aspects of the present invention may be observed in a method of operating an audio conferencing system. A method in accordance with the present invention may comprise receiving a plurality of microphone signals, selecting at least two groups of microphone signals from the plurality of microphone signals, and processing each of the at least two groups of microphone signals using an adaptive beamforming technique. The processing may produce an output signal for each of the at least two groups of microphone signals, and may combine the output signals. An embodiment of the present invention may also comprise performing acoustic echo cancellation on at least a portion of the plurality of microphone signals. The selecting may be based upon at least one of an amplitude of a microphone signal, a propagation delay, and an input from a user, and the adaptive beamforming technique may comprise at least one of a normalized least mean squares algorithm and a recursive least squares algorithm.

These and other features and advantages of the present invention may be appreciated from a review of the following detailed description of the present invention, along with the accompanying figures in which like reference numerals refer to like parts throughout.

DETAILED DESCRIPTION OF THE INVENTION

Aspects of the present invention relate to audio conferencing systems. In particular, certain aspects of the present invention relate to a system and method for providing high quality audio conferencing using adaptive beamforming techniques.

Figure 1:
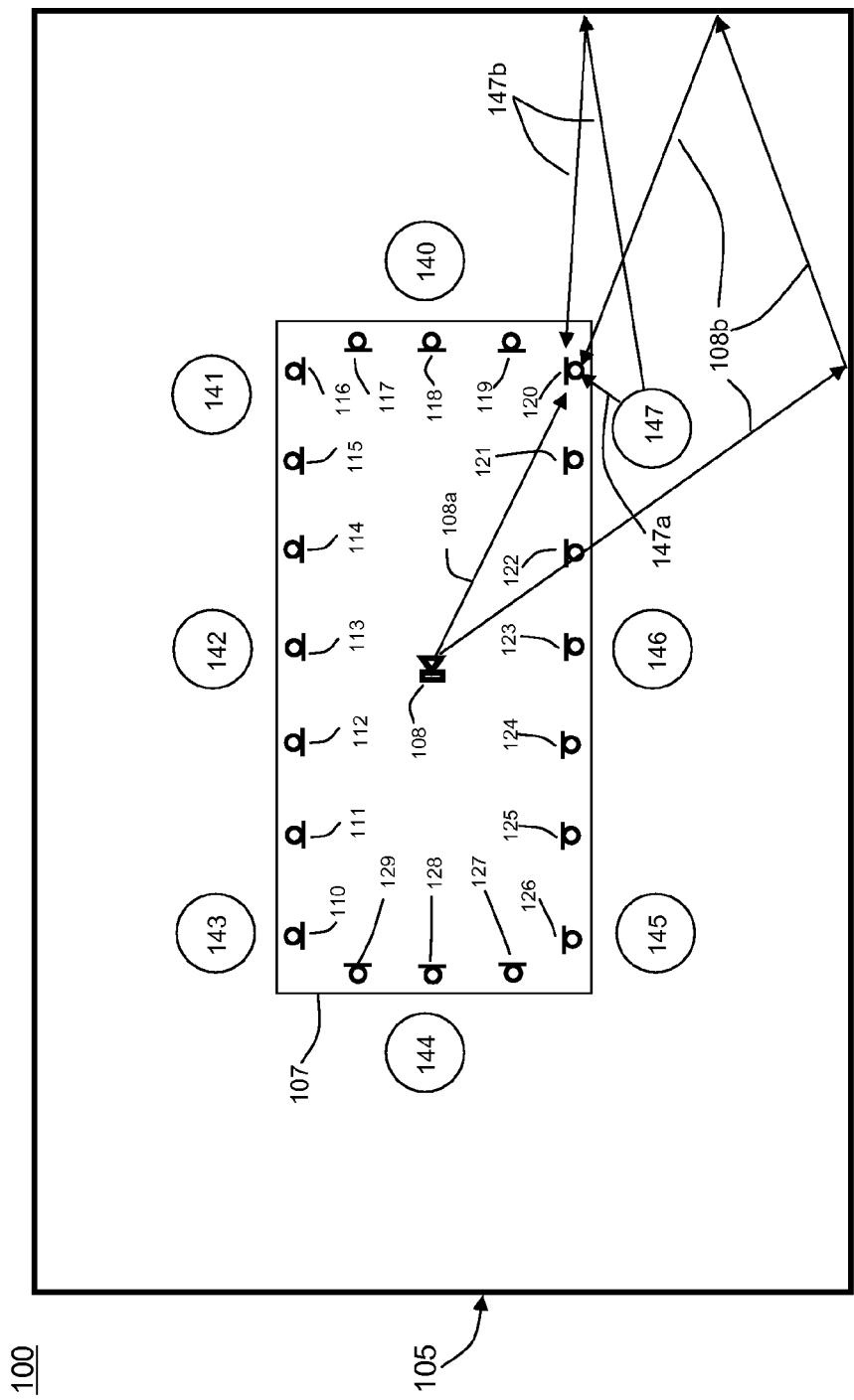
FIG. 1 is a block diagram showing an overhead view of an exemplary audio teleconferencing environment comprising a conference room, a conference table surrounded by conference attendees, a loudspeaker, and a group of spatially dispersed microphones, in accordance with an embodiment of the present invention.

FIG. 1 is a block diagram showing an overhead view of an exemplary audio teleconferencing environment 100 comprising a conference room 105, a conference table 107 surrounded by conference attendees 140-147, a loudspeaker 108, and a group of spatially dispersed microphones 110-129, in accordance with an embodiment of the present invention. The microphones 110-129 may be directional microphones, and may be positioned, for example, at regular intervals along the edges, or just under the lip of the conference table 107. A spacing of, for example, 6-12 inches may be used between microphones. Although 20 microphones are shown in FIG. 1, a greater or lesser number of microphones may be used in an embodiment in accordance with the present invention, depending upon the spacing, the dimensions of the conference table 107, and microphone placement. The loudspeaker 108 may be a single loudspeaker located near the center of conference table 107, or it may comprise two or more loudspeakers located in the ceiling above the conference table 107, or on the walls of the conference room 105. In the illustration of FIG. 1, the conference attendees 140-147 are engaged in an audio teleconferencing session with a far-end party (not shown).

In a typical teleconference session, some of the teleconference attendees 140-147 actively contribute, while others may contribute only occasionally, if at all. The sound energy produced by each attendee may include, for example, speech, the noise of papers shuffling, the tapping of a pencil, or the movement of feet or furniture. Each of these sounds take a number of paths within the conference environment 100. Each path is either a direct path, by which the sound arrives first at the receiver, or an indirect path in which the sound energy is bounced from surface to surface within the audio teleconferencing environment 100. The shortest, most direct speech path for each participant is of primary interest. The speech energy which takes an indirect path, and the other sounds of attendee activity listed above are potential sources of noise that may be picked up by the microphones 110-129 and transmitted to the far-end teleconference attendees.

As illustrated in FIG. 1, the speech energy from conference participant 147 may take a direct path 147a and/or an indirect path 147b to microphone 120. In addition, the speech energy from loudspeaker 108 may take a direct path 108a and/or an indirect path 108b to microphone 120. It should be noted that the illustration of FIG. 1 has been simplified for clarity, and that the speech energy from loudspeaker 108 and conference participant 147 will, in all likelihood, travel over a much larger number of indirect paths on its journey to microphone 120 than those illustrated in FIG. 1. Each of the indirect paths, and all but one of the direct paths from a conference participant 140-147 and a microphone 110-129 constitute an additional source of noise in the signals from microphones 110-120.

The signal received from the far-end conference location is played back through loudspeaker 108, and is received by one or more of the microphones 110-129. The portion of the far-end signal received by microphones 110-129 is normally referred to as "acoustic echo". An embodiment of the present invention may minimize the acoustic echo in the signals from each of the microphones 110-129 before proceeding to combine the microphone signals for transmission to the far-end party. The speech signal received from the far-end and played back through loudspeaker 108 may be used as a reference signal in the cancellation of the acoustic echo in the signals from microphones 110-129.

Following acoustic echo cancellation, an embodiment in accordance with the present invention may combine the signals from one or more groups of microphones selected from, for example, the microphones 110-129 of FIG. 1, in order to implement one or more adaptive beamforming groups. The number of adaptive beamforming groups and the number of microphones in each adaptive beamforming group may be arranged to enhance the reception of speech signals from a selected set of conference participants 140-147. For example, an embodiment of the present invention may identify a primary microphone for each of a predetermined number of "dominant" speakers among conference participants 140-147 based upon, for example, the power level from each of the microphones 110-129. Using information about the spatial relationship of the microphones 110-129, such an embodiment may then select one or more neighboring microphones for each of the identified primary microphones. Information about the spatial relationship of the microphones 110-129 may be provided during system installation or setup using, for example, a keypad, a console unit, or a remote control. Each of the identified primary microphones and its selected neighboring microphones form an adaptive beamforming group. A combined signal for each adaptive beamforming group may be calculated from the sampled, digitized speech of each of the microphones in the adaptive beamforming group. Such an embodiment of the present invention may use a normalized least mean squares or recursive least squares algorithm to implement an adaptive beamforming arrangement using the spatially-distributed, directional microphones in each of the adaptive beamforming groups. The adaptive beamforming algorithm used for the adaptive beamforming group for each dominant speaker may operate independently from that of other adaptive beamforming groups. In this manner, the signals from each of the microphones of an adaptive beamforming group may be combined to minimize contributions of sounds not originating from the dominant speaker for that adaptive beamforming group, and to maximize the signal of the dominant speaker assigned to that beamforming group. The processing for the above algorithms may be performed, for example, using a digital signal processor.

In one embodiment of the present invention, for example, the algorithms of the above described arrangement may compute the power level of the signals from microphones 110-129, and rank order them in decreasing order of signal power. The algorithms may then select or identify a predetermined number, N, of microphones with the greatest signal power. Each one of the identified microphones may then be considered to be a "primary" microphone for one of N dominant speakers from conference participants 140-147. Using information about the spatial relationship of the microphones, an embodiment of the present invention may select N groups of microphones based upon, for example, the proximity of each microphone to a given primary microphone, coverage pattern of each microphone relative to the coverage pattern of a primary microphone, a combination of the above, including a heuristic-based approach.

Figure 2A:
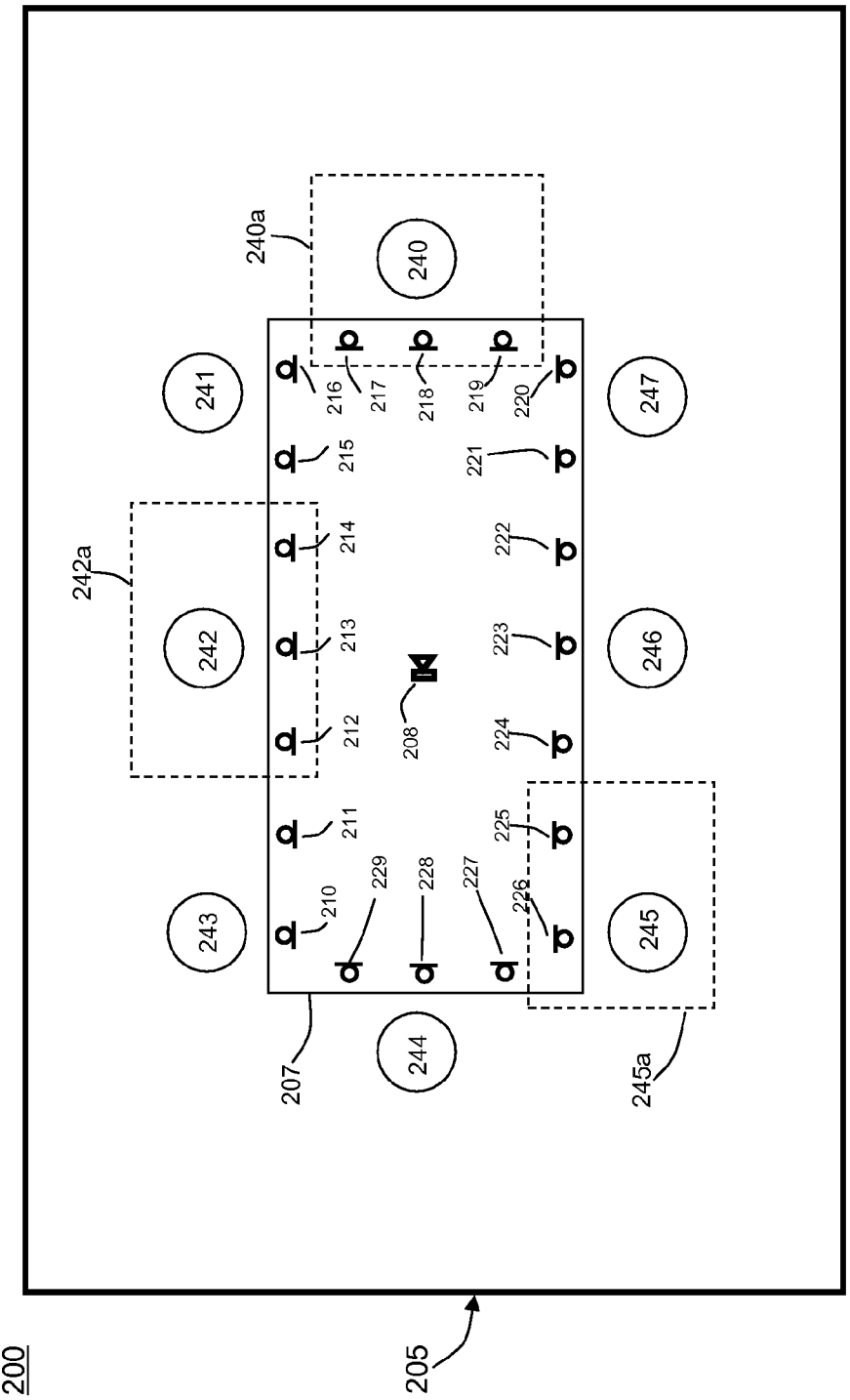
FIG. 2A is a block diagram illustrating three adaptive beamforming groups in an overhead view of an exemplary audio teleconferencing environment comprising a conference room, a conference table surrounded by conference attendees, a loudspeaker, and a group of spatially dispersed microphones, in accordance with an embodiment of the present invention.

FIG. 2A is a block diagram illustrating three adaptive beamforming groups 240a, 242a, 245a in an overhead view of an exemplary audio teleconferencing environment 200 comprising a conference room 205, a conference table 207 surrounded by conference attendees 240-247, a loudspeaker 208, and a group of spatially dispersed microphones 210-229, in accordance with an embodiment of the present invention. The microphones 210-229 may be directional microphones, and may be positioned, for example, at regular intervals along the edges, or just under the lip of the conference table 207. A spacing of, for example, 6-12 inches may be used between microphones 210-229. As can be seen in the illustration of FIG. 2, adaptive beamforming group 240a comprises a primary microphone 218 and two neighbor microphones 217, 219, adaptive beamforming group 242a comprises a primary microphone 213 and two neighbor microphones 212, 214, and adaptive beamforming group 245a comprises a primary microphone 226 and one neighbor microphone 225. The identification of the dominant speakers and, therefore, the selection of the primary and neighbor microphones for each dominant speaker may be periodically re-evaluated, in order to track the dynamics of group interaction. Parameters used in an embodiment of the present invention may include the periodicity of identification of the dominant speakers, the algorithm used for the computation of the speech power from microphones 210-229, the maximum number of dominant speakers/adaptive beamforming groups, and criteria used for selection of the neighbor microphones that make up each adaptive beamforming group, to name just a few of the factors.

As in the case of the example illustrated in FIG. 1, the acoustic signals received from the loudspeaker 208 by one or more of the microphones 210a-229a are collectively referred to as "acoustic echo". An embodiment in accordance with the present invention may minimize the components of acoustic echo in the signals from each of the microphones 210-229 before performing further processing of the microphone signals for transmission to the far-end party. The speech signal received from the far-end and played back through loudspeaker 208 may be used as a reference signal in the cancellation of the acoustic echo in the signals from the microphones 210-229.

Once the dominant speakers have been identified, and the primary and neighbor microphones selected, the signals from each of the microphones of each adaptive beamforming group may be combined using, for example, a normalized least mean squares (NLMS) or a recursive least squares (RLS) algorithm. Details concerning the application of the normalized least mean squares and recursive least squares algorithms may be found in "Microphone Arrays", M. Brandstein and D. Ward, Eds., Springer-Verlag, N.Y., 2001, and will not be provided here. The resulting signals, one for each adaptive beamforming group, may be further combined before transmission to the intended recipient.

In an embodiment of the present invention, the number of adaptive beamforming groups included in the transmit signal may be controlled remotely by the far-end participants using, for example, a key pad, a console device, or a remote control attached to an audio conferencing system. For instance, a keypad may be used to increase or decrease the number of participants whose speech audio is included in the signal transmitted to the far end from the near-end audio teleconferencing environment 200. By pressing a particular key on the keypad of the far-end audio conferencing system, a message may also be sent to the near-end audio conferencing system to increase or decrease the relative speech amplitude of an identified adaptive beamforming group corresponding to a particular dominant speaker. In this manner, a far-end conference participant may include or exclude speakers by increasing or reducing the number of active adaptive beamforming groups, and by adjusting the portion of the total conference audio signal taken from each adaptive beamforming group.

Figure 2B:
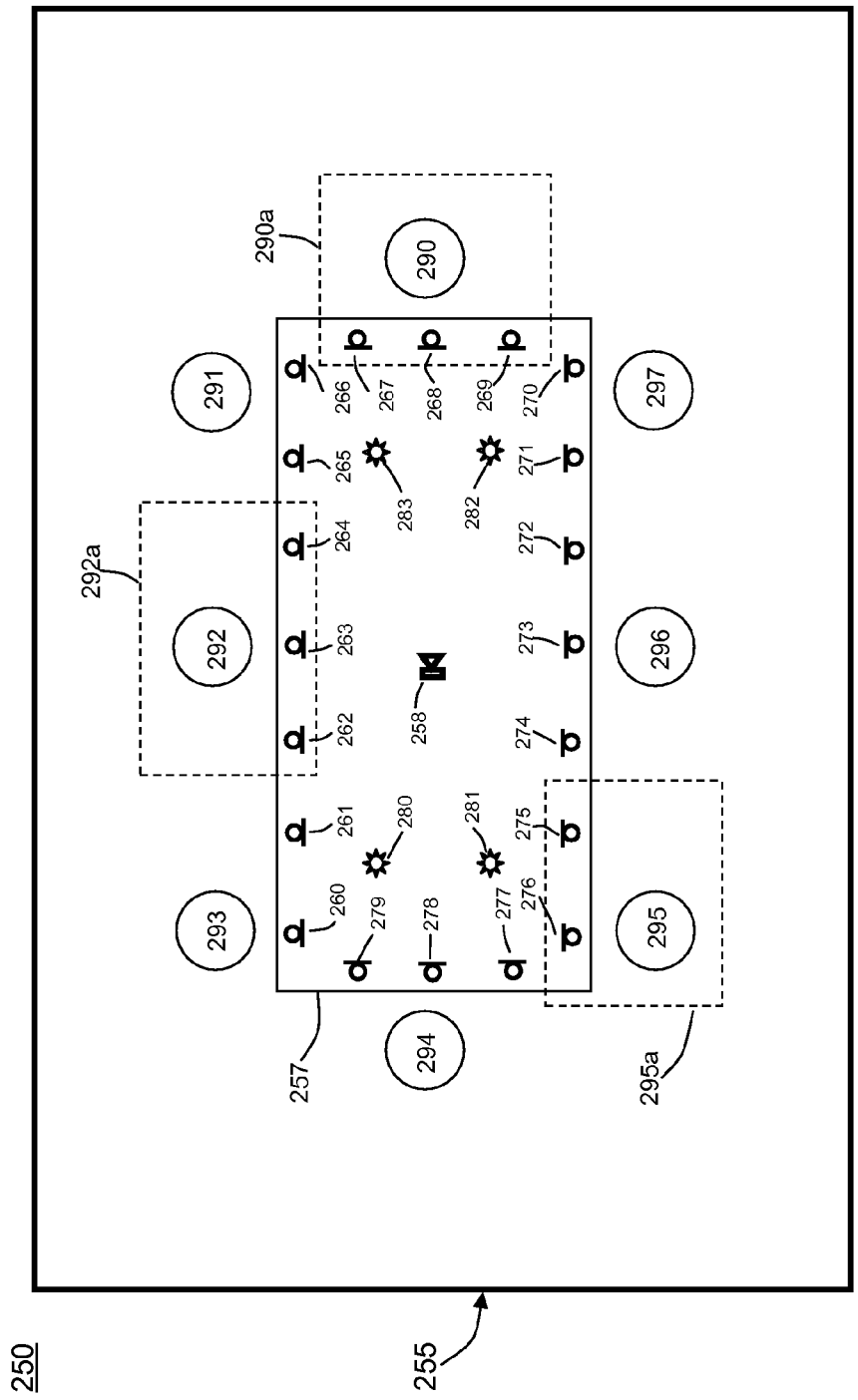
FIG. 2B is a block diagram illustrating an overhead view of another exemplary audio teleconferencing environment comprising a conference room, a conference table surrounded by conference attendees, a loudspeaker, a group of spatially dispersed directional microphones, and a number of spatially dispersed omni-directional microphones, in accordance with an embodiment of the present invention.

FIG. 2B is a block diagram illustrating an overhead view of another exemplary audio teleconferencing environment 250 comprising a conference room 255, a conference table 257 surrounded by conference attendees 290-297, a loudspeaker 258, a group of spatially dispersed directional microphones 260-279, and a number of spatially dispersed omni-directional microphones 280-283, in accordance with an embodiment of the present invention. The directional microphones 260-279 may be positioned, for example, at regular intervals along the edges, or just under the lip of the conference table 257. A spacing of, for example, 6-12 inches may be used between directional microphones 260-279. As can be seen in the illustration of FIG. 2B, adaptive beamforming group 290a comprises a primary directional microphone 268 and two neighbor directional microphones 267, 269, adaptive beamforming group 292a comprises a primary directional microphone 263 and two neighbor directional microphones 262, 264, and adaptive beamforming group 295a comprises a primary directional microphone 276 and one neighbor directional microphone 275. As in the embodiment shown in FIG. 2A, the identification of the dominant speakers and, therefore, the selection of the primary and neighbor microphones for each dominant speaker in FIG. 2B may be periodically re-evaluated, in order to track the dynamics of group interaction. Parameters used in an embodiment of the present invention may include the periodicity of identification of the dominant speakers, the algorithm used for the computation of the speech power from microphones 260-279, the maximum number of dominant speakers/adaptive beamforming groups, and criteria used for selection of the neighbor microphones that make up each adaptive beamforming group, to name just a few of the factors.

As in the case of the example illustrated in FIG. 2A, the acoustic signals received from the loudspeaker 258 by one or more of the directional microphones 260a-279a are collectively referred to as "acoustic echo". An embodiment in accordance with the present invention may minimize the components of acoustic echo in the signals from each of the directional microphones 260-279 before performing further processing of the microphone signals for transmission to the far-end party. Cancellation of acoustic echo may also be applied to the signals from the omni-directional microphones 280-283. The speech signal received from the far-end and played back through loudspeaker 258 may be used as a reference signal in the cancellation of the acoustic echo in the signals from the directional microphones 260-279, and the omni-directional microphones 280-283.

Once the dominant speakers have been identified, and the primary and neighbor directional microphones selected, the signals from each of the directional microphones of each adaptive beamforming group may be combined using, for example, a normalized least mean squares (NLMS) or a recursive least squares (RLS) algorithm. The resulting signals, one for each adaptive beamforming group, may be further combined before transmission to the intended recipient.

Various aspects of the embodiments of the present invention illustrated in FIGS. 2A and 2B are similar. FIG. 2B, however, comprises omni-directional microphones 280-283, in addition to the directional microphones 260-279. In an embodiment of the present invention, the omni-directional microphones 280-283 may be positioned about the surface of conference table 255, or at intervals along the edge, or just under the lip, of conference table 255. Although the illustration of FIG. 2B shows four omni-directional microphones 280-283, an embodiment of the present invention may incorporate a greater or lesser number without departing from the spirit of the present invention. In an embodiment of the present invention, the signals from omni-directional microphones 280-283 may be selected for use in place of, or in addition to, the directional microphones 260-279. This may be based upon room conditions such as, for example, room noise, the level of acoustic echo, and the detection of side conversations, most typically by non-dominant speakers. For example, in very quiet conference room conditions, an embodiment of the present invention may switch from the use of the adaptive beamforming approach using directional microphones 260-279, to an approach using the signals from the omni-directional microphones 280-283. The switching from one mode to the other may use a graceful "fade-in" and "fade-out", to minimize the undesirable acoustic impact of switching. An embodiment in accordance with the present invention may smoothly vary the directional adaptive array coefficients of each of the active adaptive beamforming groups over a period of time, to approximate the omni-directional configuration.

For example, in switching from the use of adaptive beamforming groups 290a, 292a, 295a shown in FIG. 2B to the omni-directional microphones 280-283, the directional adaptive array coefficients associated with the adaptive beamforming groups 290a, 292a, 295a may be gradually modified to approximate an omni-directional configuration over a second or so. In a similar fashion, in switching from the use of omni-directional microphones 280-283 to the use of adaptive beamforming, the algorithms may perform the identification of the adaptive beamforming groups as described above (e.g., forming adaptive beamforming groups 290a, 292a, 295a), may then initially configure the adaptive array coefficients to approximate an omni-directional arrangement, and may then gradually modify the operation of the adaptive beamforming groups 280-283 to provide more selective reception of the speech from the identified dominant speakers. The transition from the use of the omni-directional microphones 280-283 to the use of the use of adaptive beamforming using the directional microphones 260-279 may also be performed over a period of a second or so. An embodiment of the present invention may provide the control flexibility to allow a user to modify the operation of the switching algorithm between the omni-directional microphones, and the adaptive beamforming approach using directional microphones. The user may also be permitted to restrict operation to the use of either mode of operation (i.e., using adaptive beamforming with directional microphones, or using omni-directional microphones).

In an embodiment of the present invention, the number of adaptive beamforming groups included in the transmit signal may be controlled remotely by the far-end participants using, for example, a key pad, a console device, or a remote control attached to an audio conferencing system. For instance, a keypad may be used to increase or decrease the number of participants whose speech audio is included in the signal transmitted to the far end from the near-end audio teleconferencing environment 250. By pressing a particular key on the keypad of the far-end audio conferencing system, a message may also be sent to the near-end audio conferencing system to increase or decrease the relative speech amplitude of an identified adaptive beamforming group corresponding to a particular dominant speaker. In addition, the far-end participants may be permitted to adjust parameters related to the switching between the operating modes of the embodiment illustrated in FIG. 2B. In this manner, a far-end conference participant may include or exclude speakers by increasing or reducing the number of active adaptive beamforming groups and/or by adjusting the portion of the total conference audio signal taken from each adaptive beamforming group, and may adjust or restrict the switching from operation using adaptive beamforming, to the use of omni-directional microphones.

Figure 3:
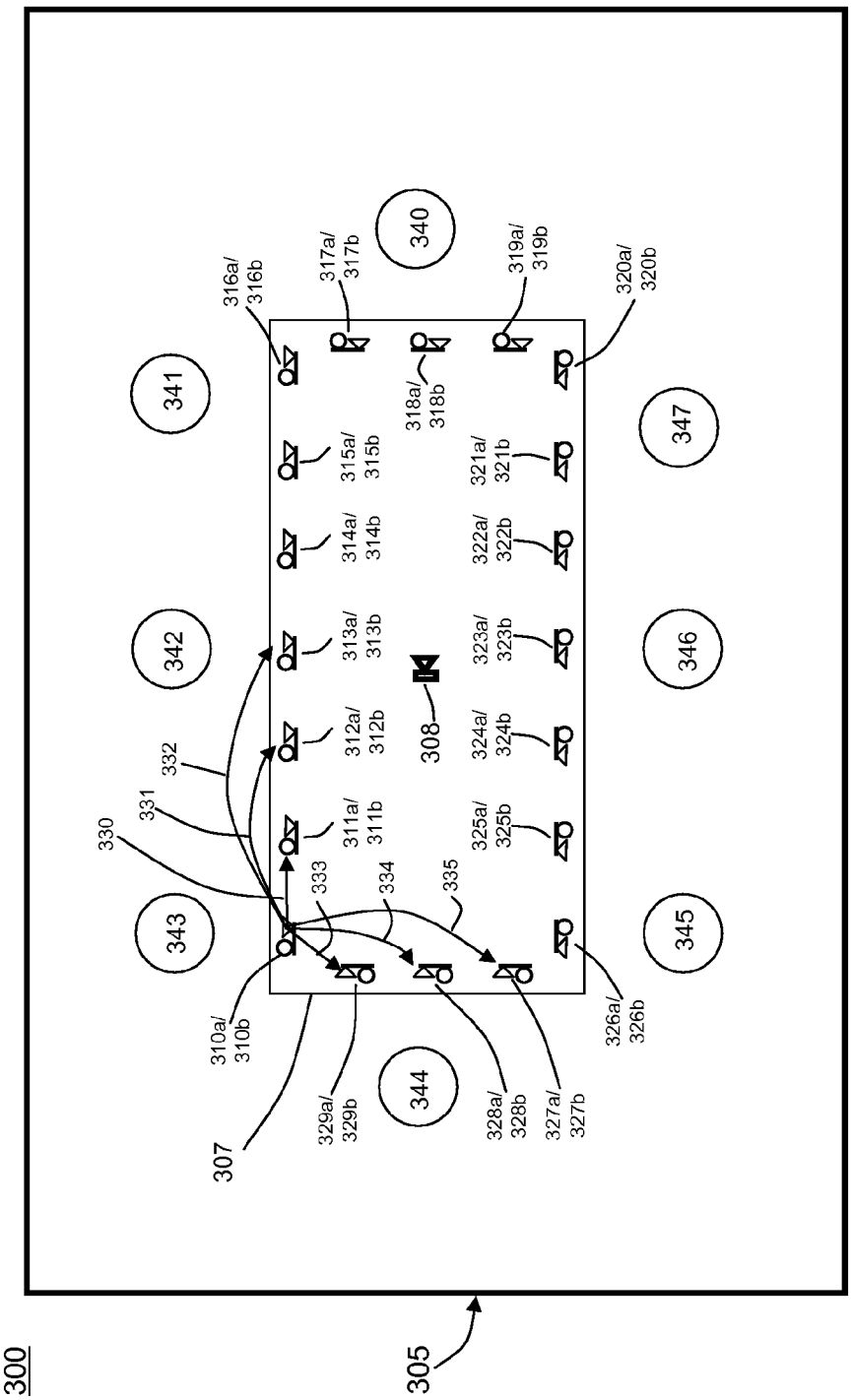
FIG. 3 is a block diagram showing an overhead view of another exemplary audio teleconferencing environment comprising a conference room, a conference table surrounded by conference attendees, a loudspeaker, and a number of conference stations, in accordance with an embodiment of the present invention.

FIG. 3 is a block diagram showing an overhead view of another exemplary audio teleconferencing environment 300 comprising a conference room 305, a conference table 307 surrounded by conference attendees 340-347, a loudspeaker 308, and a number of conference stations 310-329, in accordance with an embodiment of the present invention. The conference stations 310-329 may be positioned, for example, at regular intervals of between approximately 6 and 12 inches along the edges, or just under the lip of the conference table 307. Although 20 conference stations are shown in FIG. 3, a greater or lesser number of conference stations may be used in an embodiment in accordance with the present invention, depending upon the spacing, the dimensions of the conference table 307, and conference station placement. The loudspeaker 308 may be a single loudspeaker located near the center of conference table 307, or it may comprise two or more loudspeakers located in the ceiling above the conference table 307, or on the walls of the conference room 305. In the illustration of FIG. 3, the conference attendees 340-347 are engaged in an audio teleconferencing session with a far-end party (not shown).

In the embodiment of the present invention illustrated in FIG. 3, each of the conference stations 310-329 may comprise one of microphones 310a-329a. As in the case of the examples illustrated in FIGS. 1 and 2, the acoustic signals received from the loudspeaker 308 by one or more of the microphones 310a-329a of the conference stations 310-329 are collectively referred to as "acoustic echo". An embodiment in accordance with the present invention may minimize the components of acoustic echo in the signals from each of the microphones 310a-329a before proceeding to combine the microphone signals for transmission to the far-end party. The speech signal received from the far-end and played back through loudspeaker 308 may be used as a reference signal in the cancellation of the acoustic echo in the signals from the microphones 310a-329a. The details of acoustic echo cancellation are well know in the art, and are not described here.

In the embodiment of the present invention illustrated in FIG. 3, in addition to one of the microphones 310a-329a, each of the conference stations 310-329 may also comprise a corresponding acoustic emitter 310b-329b, respectively. Each of the microphones 310a-329a of each of the conference stations 310-329 functions in a manner similar to that of the microphones 210-229 of FIG. 2 in converting the sound energy within the audio teleconferencing environment 300 to an electrical representation, and may be a directional microphone. Each of the acoustic emitters 310b-329b of the conference stations 310-329 are in close proximity to the associated microphones 310a-315a, for example, within the same housing, and each may be used to generate an acoustic test signal to be received by a microphone in one of the conference stations 310-329. Such a test signal may enable an embodiment in accordance with the present invention to make measurements of, for example, the acoustic delay between one of the conference stations 310-329, and each of the other of the conference stations 310-329. For example, the propagation delay of the path 330 from the acoustic emitter 310b of the conference station 310 to the microphone 311a of conference station 311, the propagation delay of the path 331 from the acoustic emitter 310b of the conference station 310 to the microphone 312a of conference station 312, and the propagation delay of the path 335 from the acoustic emitter 310b of the conference station 310 to the microphone 328a of conference station 328 may be determined using this technique. Although the diagram shown in FIG. 3 illustrates only six paths 330, 331, 332, 333, 334, 335, the illustration has been simplified for clarity, and an embodiment of the present invention is not limited in this manner. The propagation delay, and therefore the distance, between any two conference stations 310-329 may be determined in this manner in an embodiment of the present invention. In addition, the acoustic emitters 310b-329b may enable an embodiment of the present invention to measure other characteristics of the audio teleconferencing environment 300. An example of such a characteristic is a characterization of the frequency response of the path from one of the conference stations 310-329 and any of the other of the conference stations 310-329.

Various aspects of the embodiment shown in FIG. 3 operate in a fashion similar to the exemplary embodiment illustrated in FIG. 2. For example, following acoustic echo cancellation, the embodiment illustrated in FIG. 3 may selectively combine the signals from one or more groups of microphones selected from, for example, the microphones 310a-329a of FIG. 3, in order to implement one or more adaptive beamforming groups. The number of adaptive beamforming groups and the number of microphones in each adaptive beamforming group may be arranged to enhance the reception of speech signals from a selected set of conference participants 340-347. For example, an embodiment of the present invention may identify a predetermined number of "dominant" speakers among conference participants 340-347 based upon, for example, the power level from each of the microphones 310a-329a. A primary microphone may then be identified for each of the dominant speakers. Using information about the spatial relationship of the microphones 310a-329a, such an embodiment may then select one or more neighboring microphones for each of the identified primary microphones. Each of the identified primary microphones and its selected neighboring microphones may then be used to form an adaptive beamforming group. A combined signal for each adaptive beamforming group may be calculated from the sampled, digitized speech of each of the microphones in the adaptive beamforming group. Such an embodiment of the present invention may use, for example, a normalized least mean squares or recursive least squares algorithm to implement an adaptive beamforming arrangement using the spatially-distributed microphones in each of the adaptive beamforming groups. The adaptive beamforming algorithm used for the adaptive beamforming group for each dominant speaker may operate independently from the that of other adaptive beamforming groups. In this manner, the signals from each of the microphones of an adaptive beamforming group may be combined to minimize contributions from sounds not originating from the dominant speaker for that adaptive beamforming group, and to maximize the signal of the dominant speaker assigned to that adaptive beamforming group. The processing for the above algorithms may be performed, for example, using a digital signal processor.

The algorithms used to combine the signals from each of the microphones 310a-329a may incorporate information regarding the acoustic characteristics of the audio teleconferencing environment 300. For example, the delay between the signals emitted by a particular acoustic emitter 310b-329b and its detection by one or more of the microphones 310a-329a may be used to calculate distances between the conference stations 310-329. Amplitude information for the signals from the microphones 310a-329a may be used in combination with distance information to aid in determining the suitability of a particular microphone 310a-329a for inclusion in an adaptive beamforming group. Such distance and amplitude information may be generated through testing performed using the acoustic emitters 310b-329b and the microphones 310a-329a of conference stations 310-329. Using the information derived from such testing, an embodiment of the present invention more effectively combines the speech signals from conference participants.

Figure 4:
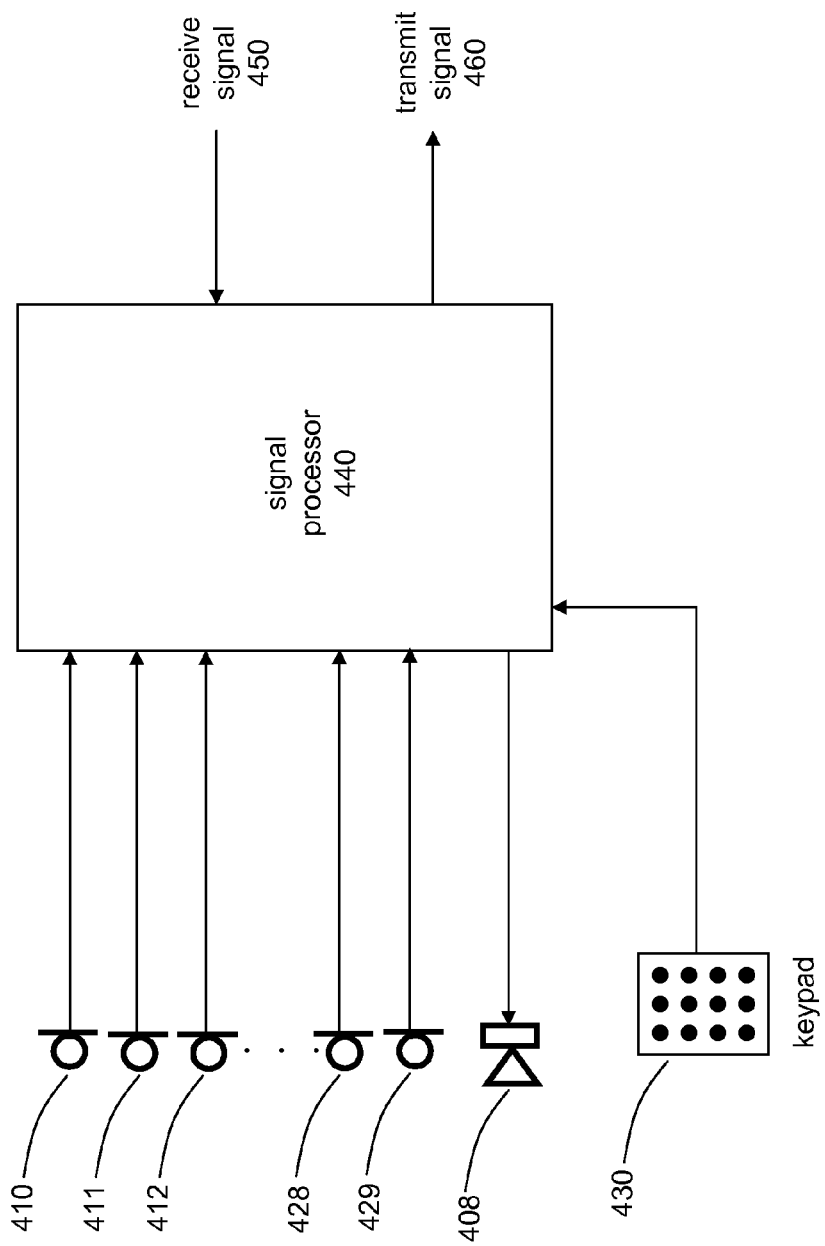
FIG. 4 is a block diagram of an exemplary embodiment of an audio teleconferencing system supporting adaptive beamforming, in accordance with an embodiment of the present invention.

FIG. 4 is a block diagram of an exemplary embodiment of an audio teleconferencing system 400 supporting adaptive beamforming, in accordance with an embodiment of the present invention. The audio teleconferencing system 400 comprises a spatially dispersed group of microphones 410-429 (microphones 413-427 not shown, for clarity), a loudspeaker 408, a keypad 430, and a signal processor 440. The microphones 410-429 may correspond, for example, to the microphones 110-129 of FIG. 1. The signal processor 440 receives signals from the microphones 410-429 and combines the signals from groups of microphones in the manner described above with respect to FIG. 2. This combining may use a set of algorithms that may include, for example, adaptive beamforming algorithms based upon a normalized least mean squares or recursive least squares approach, to produce a transmit signal 460 for transmission to a far-end teleconference location. The signal processor 440 also processes a receive signal 450 from a far-end teleconferencing location, producing an electrical signal that is converted into sound by loudspeaker 408. The keypad 430 permits the users of audio conferencing system 400 to control teleconference system operation. This may include such functions as, for example, placing calls using the public switched telephone (PSTN) or a packet-based network, and the adjustment of system parameters of audio teleconferencing system 400. The keypad 430 may also be used to control a compatible audio conferencing system at the far-end such that the amplitude of the audio for selected far-end attendees may be increased or decreased.

A user of audio conferencing system 400 may use a key press on the keypad 430 to identify the far-end conference participant whose speech signal should be increased or decreased in amplitude. For example, by pressing on the "*" key on keypad 430 while a particular far-end participant is speaking, a near-end conference participant may request that the far-end audio teleconferencing system increase the gain applied to the speech signal of the speaking far-end participant. In a similar fashion, pressing the "#" key on keypad 430 may request that the far-end audio conferencing system decrease the gain applied to the speech signal of the speaking far-end participant. The keypad may also be used to select the number of dominant speakers included in the speech signals sent to the other party, and to enter system parameters, described above, during the installation of audio conferencing system 400. The keypad 430 may take other forms including, for example, a graphical interface, or a remote control device.

Figure 5:
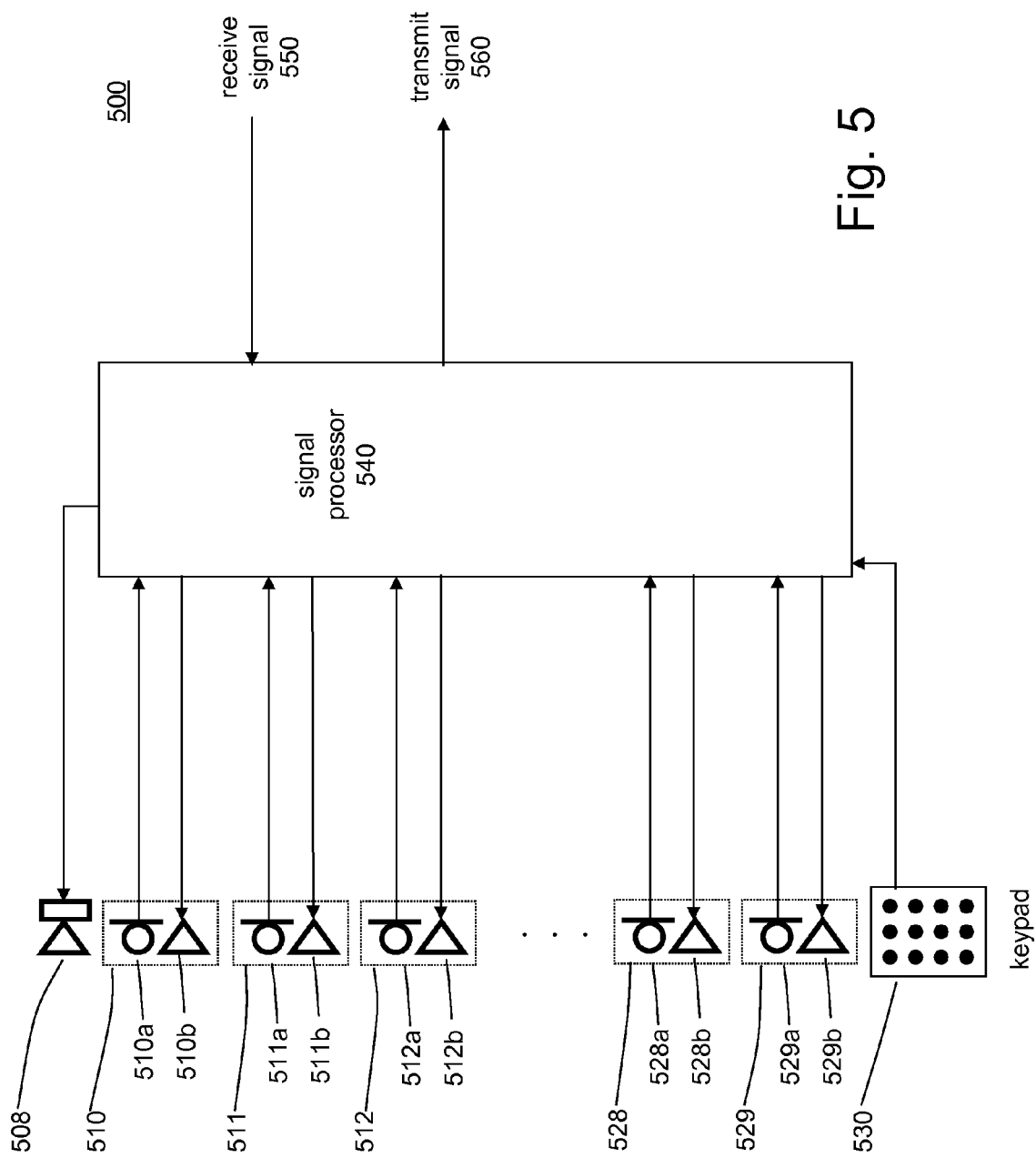
FIG. 5 is a block diagram of another exemplary embodiment of an audio teleconferencing system supporting adaptive beamforming, in accordance with an embodiment of the present invention.

FIG. 5 is a block diagram of another exemplary embodiment of an audio teleconferencing system 500 supporting adaptive beamforming, in accordance with an embodiment of the present invention. The audio teleconferencing system 500 comprises a spatially dispersed group of conference stations 510-529 (conference stations 513-527 not shown, for clarity), a loudspeaker 508, a keypad 530, and a signal processor 540. Each of the conference stations 510-529 comprise a microphone 510a-529a and an associated acoustic emitter 510b-529b. In various aspects, the audio teleconferencing system 500 of FIG. 5 operates similar to the audio teleconferencing system 400 of FIG. 4. Specifically, the signal processor 540 receives signals from the microphones 510a-529a of the group of conference stations 510-529 and combines the signals from selected groups of microphones 510a-529a using a set of algorithms including for example, adaptive beamforming algorithms based upon a normalized least mean squares or recursive least squares approach, to produce a transmit signal 560 for transmission to a far-end teleconference location. In addition, the signal processor 540 may process a receive signal 550 from a far-end teleconferencing location and produce an electrical signal that is converted into sound by loudspeaker 508. The receive signal 550 and transmit signal 560 may be analog or digital signals, and may be compatible with a circuit switched network or a packet switched network.

The keypad 530 of FIG. 5 may permit a user of audio conferencing system 500 to manage system operation. This may include operations such as, placing calls using the public switched telephone network (PSTN) or a packet-based network, and the adjustment of system parameters of audio teleconferencing system 500. The keypad 530 may also be used to control a compatible audio teleconferencing system at the far-end of a teleconferencing call. Such control may include requesting that the audio for selected far-end attendees be increased or decreased.

In addition to the functionality described above, the signal processor 540 of audio conferencing system 500 may use the acoustic emitters 510b-529b associated with the microphone components 510a-529a, respectively, and the loudspeaker 508, to selectively generate acoustic signals within a conference room, such as the conference room 305 of FIG. 3. In doing so, the signal processor 540 may determine various acoustic characteristics of the relationships of the microphones 510a-529a in the conference stations 510-529. For example, a signal processor such as signal processor 540 may elect to send an acoustic signal to acoustic emitter 510b, while sampling the signal received from one of the microphones associated with any of the other acoustic emitters 510b-529b. By selecting various combinations of acoustic emitters and microphones, the signal processor 540 may develop a set of parameters for the arrangement of the conference stations 510-529 that will enable the signal processor to more effectively process the signals from the microphones 510a-529a. Characteristics such as delay, phase, and relative attenuation across the audio spectrum may be determined. These characteristics are used by the algorithms executed on signal processor 540 to more effectively isolate the speech signals for the individual conference attendees present in a conference room such as, for example, conference room 305 of FIG. 3. In addition, an embodiment of the present invention may detect the failure or absence of one or more conference stations 510-529.

Figure 6:
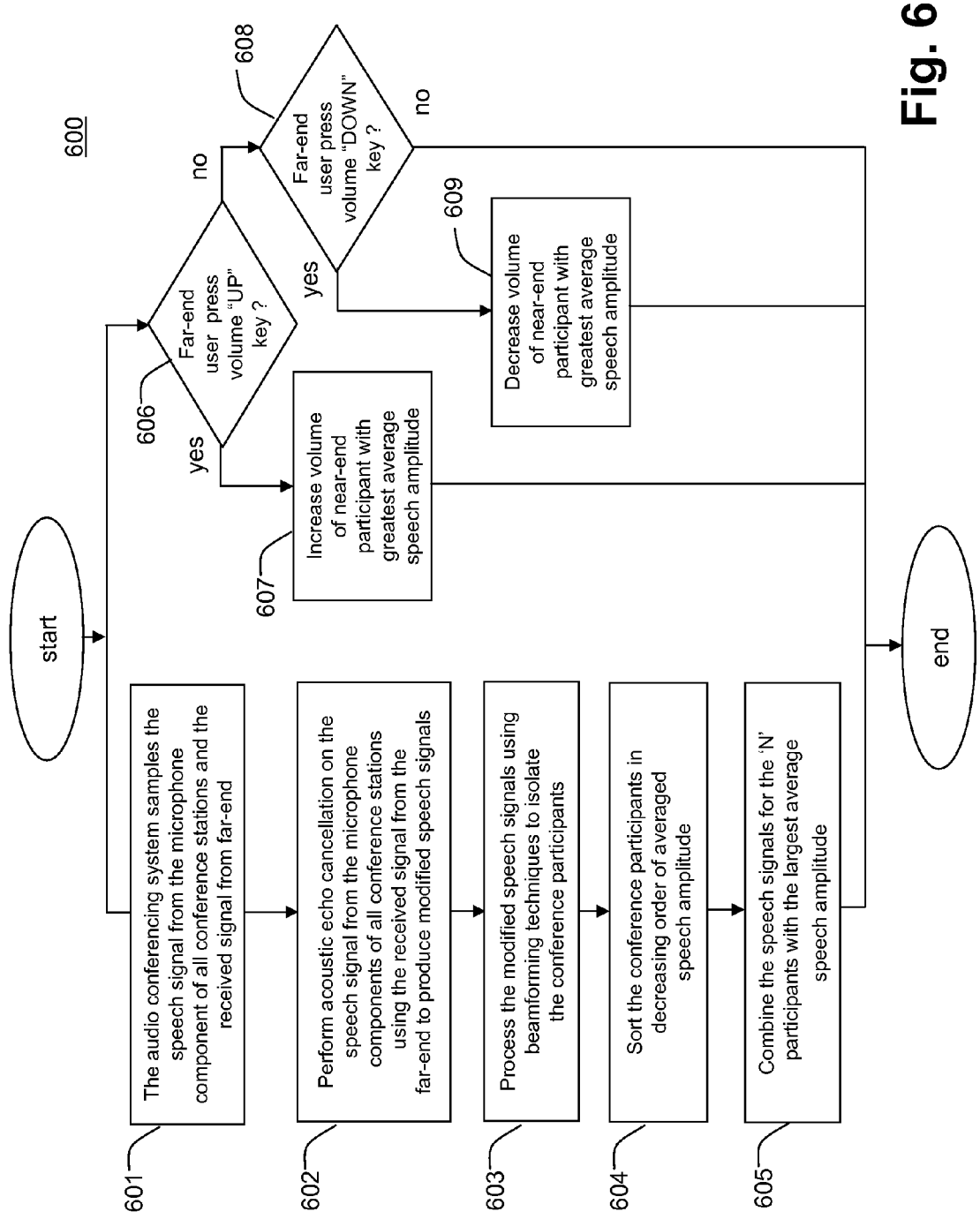
FIG. 6 is a flowchart of an exemplary method of operating a high-quality audio conferencing system with adaptive beamforming, in accordance with an embodiment of the present invention.

FIG. 6 is a flowchart of an exemplary method of operating a high-quality audio conferencing system with adaptive beamforming, in accordance with an embodiment of the present invention. The flowchart illustrated in FIG. 6 is organized as two branches to illustrate that the activities of the two branches may proceed in parallel. In the left branch, the audio conferencing system samples the speech signal from the microphone component of all conference stations and the received signal from far-end (step 601). Next, the audio conferencing system performs acoustic echo cancellation on the speech signal from the microphone components of all conference stations using the received signal from the far-end to produce modified speech signals (step 602). The audio conferencing system then processes the modified speech signals using adaptive beamforming techniques to isolate conference participants (step 603), and sorts the conference participants in decreasing order of averaged speech amplitude (step 604). The audio conference system then combines speech signals for the 'N' participants with largest average speech amplitude (step 605).

In the right branch of FIG. 6, the method checks whether a user at the far end has pressed the key requesting an increase in volume (step 606). If so, the proportion in the signal transmitted to the far end of the speech signal of the near-end participant currently having the greatest average amplitude is increased (step 607). If not, a check is made whether a user at the far end has pressed the key requesting a decrease in volume (step 608). If so the proportion in the signal transmitted to the far end of the speech signal of the near-end participant currently the greatest average amplitude is decreased (step 609).

Figure 7:
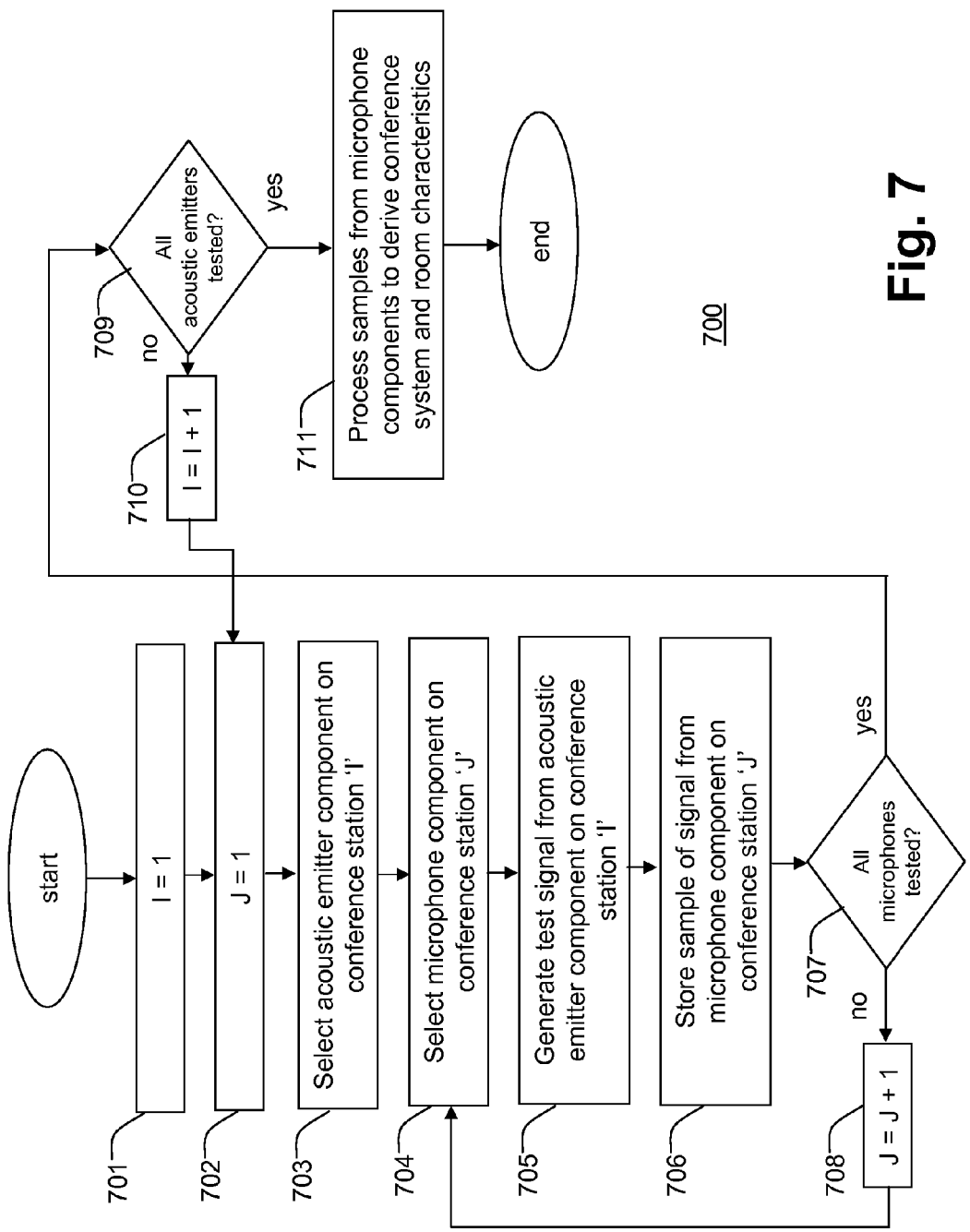
FIG. 7 is a flowchart of an exemplary method of deriving audio conference system and conference room acoustic characteristics in an audio conference system such as the audio conference system illustrated in FIG. 5, in accordance with an embodiment of the present invention.

FIG. 7 is a flowchart of an exemplary method of deriving audio conference system and conference room acoustic characteristics in an audio conference system such as the audio conference system 500 illustrated in FIG. 5, in accordance with an embodiment of the present invention. The flowchart begins by initializing a counter, I, used to identify the current conference station (step 701). The method then initializes a counter, J, used to identify the current microphone component (step 702). The acoustic emitter associated with conference station, I, is then selected (step 703), and the microphone of conference station, J, is selected for sampling (step 704). The audio conference system then generates a test signal using the acoustic emitter on conference station, I (step 705), and stores sample information from the microphone of conference station, J (step 706). A check is then made to determine whether all microphones in the system have been tested with the acoustic emitter of conference station, J (step 707). If not, the counter, J, is incremented (step 708), and the microphone from the next conference station is sampled (step 704). If the microphones from all conference stations have been sampled, the method checks whether the acoustic emitters of all conference stations have been tested (step 709). If not all have been tested, the counter, I, is incremented (step 710), and the conference station with the next untested acoustic emitter is tested (step 702). If all combinations of acoustic emitters and microphones have been tested, the method processes the sample data to derived conference system and room acoustic characteristics (step 711).

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. One or more circuits, the one or more circuits comprising:
   processing circuitry operable to communicate with a plurality of conference stations at a first location, the plurality of conference stations comprising a plurality of directional microphones that collectively produces a corresponding plurality of directional microphone signals, the processing circuitry being configured to:
   receive the plurality of directional microphone signals produced at the first location;
   receive, via a communication network from a second location remote from the first location, a first electrical signal representative of sound of a user at the second location;
   process the plurality of directional microphone signals and the first electrical signal to produce a second electrical signal; and
   transmit the second electrical signal to the second location.

2. The one or more circuits according to claim 1, wherein the processing comprises using an algorithm to perform acoustic echo cancellation.

3. The one or more circuits according to claim 1, wherein the processing circuitry that is configured to process is further configured to use an adaptive beamforming technique.

4. The one or more circuits according to claim 3, wherein the adaptive beamforming technique comprises at least one of a normalized least mean squares algorithm or a recursive least squares algorithm.

5. The one or more circuits according to claim 1, wherein the processing circuitry that is configured to process is further configured to select a portion of the plurality of directional microphone signals associated with at least two corresponding conference stations.

6. The one or more circuits according to claim 5, wherein the portion of the plurality of directional microphone signals is used in a separate adaptive beamforming arrangement.

7. The one or more circuits according to claim 1, wherein the processing circuitry that is configured to process is further configured to use at least one parameter representative of at least one of a microphone acoustic characteristic, a transmission delay, or an acoustic characteristic of a room.

8. The one or more circuits according to claim 1, wherein the processing circuitry that is configured to process is further configured to be modified remotely during operation.

9. The one or more circuits according to claim 1, wherein the processing circuitry comprises a digital signal processor.

10. The one or more circuits according to claim 1, wherein at least one of the first electrical signal and the second electrical signal are a digital signal.

11. The one or more circuits according to claim 10, wherein at least one of the first electrical signal or the second electrical signal is compliant with a packet protocol.

12. The one or more circuits according to claim 1, wherein the processing circuitry is further configured to:
   generate a first electrical test signal;
   convert the first electrical test signal to an acoustic test signal at a first of the plurality of conference stations;
   sample the acoustic test signal at a second of the plurality of conference stations;
   transform the sampled acoustic test signal into a second electrical test signal; and
   derive at least one or more of a microphone acoustic characteristic, a transmission delay, or an acoustic characteristic of a room, using the second electrical test signal.

13. The one or more circuits according to claim 1, wherein processing comprises:

identifying, from the plurality of directional microphone signals, a primary directional microphone from a plurality of conference participants.

14. The one or more circuits according to claim 13, wherein the identifying comprises:
computing a plurality of respective power levels of the plurality of directional microphones;
rank ordering the plurality of respective power levels; and
identifying the primary directional microphone from the plurality of directional microphones that has the greatest power level.

15. The one or more circuits according to claim 13, wherein the at least one processor enables a second user to remotely increase or decrease a relative contribution of the primary directional microphone to the second electrical signal.

16. The one or more circuits according to claim 13, wherein processing comprises:
selecting one or more neighboring directional microphones with respect to the primary directional microphone; and
processing directional microphones signals of the primary directional microphone and the directional microphone signals of the one or more neighboring directional microphones selected, the processing comprising forming a corresponding adaptive beamforming group.

17. The one or more circuits according to claim 16, wherein the selecting comprises using information about the spatial relationship of the plurality of directional microphones.

18. The one or more circuits according to claim 1, wherein the at least one processor is operable to perform acoustic echo cancellation separately upon the plurality of directional microphone signals using the first electrical signal before producing the second electrical signal.

19. One or more circuits, the one or more circuits comprising:
processing circuitry at a first location, the processing circuitry being operable to receive a plurality of directional microphone signals, the processing circuitry being configured to:
select a first group of directional microphone signals from the plurality of directional microphone signals and select a second group of directional microphone signals from the plurality of directional microphone signals;
process the first group and the second group using an adaptive beamforming technique, the processing producing a first output signal for the first group and a second output signal for the second group; and
combine the first output signal with the second output signal in response to one or more commands of a user at a second location remote from the first location, wherein the first output signal and the second output signal are combined to produce a combined signal; and
transmit the combined signal to the second location.

20. The one or more circuits according to claim 19, wherein the at least one processor:
performs acoustic echo cancellation on at least a portion of the plurality of directional microphone signals.

21. The one or more circuits according to claim 19, wherein the selecting is based upon at least one of a microphone signal amplitude, a propagation delay, or an input from the user.

22. The one or more circuits according to claim 19, wherein the adaptive beamforming technique comprises at least one of a normalized least mean squares algorithm or a recursive least squares algorithm.

23. At least one processor at a first location, the at least one processor comprising:
output circuitry operable to output a first electrical signal representative of sound; and
input circuitry operable to receive at least one signal representative of sound from a plurality of directional microphones disposed in a corresponding plurality of conference stations arranged in spaced relation at the first location, the plurality of directional microphones converting sound into a plurality of directional microphone signals; and
wherein the at least one processor modifies at least one directional microphone signal among the plurality of directional microphone signals in response to a second electrical signal, the second electrical signal being representative of sound at a second location remote from the first location and further in response to a command input received from a user at the second location, the at least one directional microphone signal being modified to produce a transmit signal representative of sound for transmission to the second location.

24. The at least one processor according to claim 23, wherein the modifying comprises using an algorithm to perform acoustic echo cancellation.

25. The at least one processor according to claim 23, wherein the modifying comprises using an adaptive beamforming technique.

26. The at least one processor according to claim 25, wherein the adaptive beamforming technique comprises at least one of a normalized least mean squares algorithm or a recursive least squares algorithm.

27. The at least one processor according to claim 23, wherein the modifying comprising combining the plurality of directional microphone signals in order to selectively attenuate or amplify a sound source.

28. The at least one processor according to claim 23, wherein the modifying comprises selecting, for separate processing, at least two groups of directional microphone signals from the plurality of directional microphone signals.

29. The at least one processor according to claim 28 wherein the modifying comprises modifying the at least two groups using an adaptive beamforming technique.

30. The at least one processor according to claim 23, wherein the at least one processor comprises interface circuitry operable to receive a signal from at least one omnidirectional microphone to convert a sound field into an omnidirectional microphone signal.

31. The at least one processor according to claim 30, wherein the modifying comprises combining at least one directional microphone signals among the plurality of directional microphone signals and the at least one omni-directional microphone signal, based upon at least one room condition.

32. The at least one processor according to claim 31, wherein the at least one room condition comprises at least one of background noise, a level of acoustic echo, or a detection of side conversations.

33. The at least one processor according to claim 23, wherein the plurality of conference stations comprises a plurality of corresponding transducers that are configured to produce at least one acoustic test signal.

34. The at least one processor according to claim 23, wherein the at least one processor is operable to use a test signal to determine at least one of microphone or a room acoustic characteristic.

35. The at least one processor according to claim 23 wherein a contribution to the transmit signal of a selected sound source relative to other sound sources may be increased or decreased in response to a user command received from the second location.

36. The at least one processor according to claim 23, wherein the at least one processor comprises an interface compatible with a communication network, the interface communicating the transmit signal to the communication network.

37. The at least one processor according to claim 36, wherein the communication network is a packet network.

38. The at least one processor according to claim 23, wherein the at least one processor comprises interface circuitry operable to receive signals from a manual input device used to at least one of control calls or enter system parameters.

39. The at least one processor according to claim 23, wherein the at least one processor is a digital signal processor.

* * * * *